United States Patent
Chen et al.

(10) Patent No.: US 11,460,730 B2
(45) Date of Patent: Oct. 4, 2022

(54) LIGHT SOURCE MODULE AND DUAL DISPLAY DEVICE

(71) Applicant: Coretronic Corporation, Hsin-Chu (TW)

(72) Inventors: Hui-Chuan Chen, Hsin-Chu (TW); Ching-Tai Tseng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/394,404

(22) Filed: Aug. 5, 2021

(65) Prior Publication Data

US 2022/0043303 A1    Feb. 10, 2022

(30) Foreign Application Priority Data

Aug. 7, 2020   (CN) ......................... 202021624797.X

(51) Int. Cl.
| | | |
|---|---|---|
| *G02F 1/13357* | (2006.01) | |
| *G02F 1/1335* | (2006.01) | |
| *F21V 8/00* | (2006.01) | |
| *G02F 1/1333* | (2006.01) | |
| *G02F 1/1334* | (2006.01) | |

(52) U.S. Cl.
CPC ..... *G02F 1/133603* (2013.01); *G02B 6/0025* (2013.01); *G02F 1/1334* (2013.01); *G02F 1/133342* (2021.01); *G02F 1/133607* (2021.01)

(58) Field of Classification Search
CPC ......... G02F 1/133603; G02F 1/133615; G02F 1/1334; G02B 6/0053; G02B 6/0063; G02B 6/0036; G02B 6/0025
See application file for complete search history.

(56) References Cited

U.S. PATENT DOCUMENTS

| | | | | |
|---|---|---|---|---|
| 9,791,613 | B2 * | 10/2017 | Shei | G02B 6/0036 |
| 11,042,063 | B2 * | 6/2021 | Kang | G02F 1/133605 |
| 2002/0097496 | A1 * | 7/2002 | Lu | G02B 5/045 |
| | | | | 359/628 |
| 2005/0046321 | A1 | 3/2005 | Suga et al. | |
| 2005/0206814 | A1 * | 9/2005 | Histake | G02F 1/1323 |
| | | | | 349/112 |

(Continued)

FOREIGN PATENT DOCUMENTS

| | | | | |
|---|---|---|---|---|
| CN | 1702510 | * | 11/2005 | ....... G02F 1/133504 |
| CN | 104848052 A | | 8/2015 | |

(Continued)

*Primary Examiner* — Zheng Song

(57) ABSTRACT

A light source module includes a light guide plate, a light source, a first inverse prism sheet and a second inverse prism sheet. The light guide plate has a light incident surface and opposite first light exit surface and second light exit surface. The first inverse prism sheet is disposed beside the first light exit surface, and has a first bearing surface and a plurality of first prisms. Each of the first prisms has a first surface. A first included angle is formed between the first surface and the first bearing surface. The second inverse prism sheet is disposed beside the second light exit surface, and has a second bearing surface and a plurality of second prisms. Each of the second prisms has a second surface. A second included angle is formed between the second surface and the second bearing surface. A dual display device is also provided.

11 Claims, 3 Drawing Sheets

(56) References Cited

U.S. PATENT DOCUMENTS

| | | | | |
|---|---|---|---|---|
| 2006/0181897 A1* | 8/2006 | Ueno | ................... | G02B 6/0038 |
| | | | | 362/600 |
| 2008/0239200 A1 | 10/2008 | Hirai et al. | | |
| 2015/0070903 A1 | 3/2015 | Min et al. | | |
| 2017/0261679 A1* | 9/2017 | He | ....................... | G02B 6/0055 |
| 2018/0106950 A1* | 4/2018 | Kuo | ................... | G02B 6/0055 |
| 2018/0106953 A1* | 4/2018 | Huang | ................ | G02B 6/0036 |
| 2020/0233145 A1* | 7/2020 | Yagi | .................... | G02B 6/0036 |
| 2021/0286214 A1* | 9/2021 | Chen | ................... | G02B 6/0053 |

FOREIGN PATENT DOCUMENTS

| | | | | |
|---|---|---|---|---|
| CN | 208239762 U | | 12/2018 | |
| CN | 211741786 U | | 10/2020 | |
| TW | 200627024 A | | 8/2006 | |
| TW | 201341915 A | | 10/2013 | |
| TW | 201541148 A | | 11/2015 | |
| TW | 201643516 A | | 12/2016 | |
| TW | I631397 B | | 8/2018 | |
| TW | I685704 B | | 2/2020 | |
| WO | WO 2005005881 | * | 1/2005 | .............. G02B 6/00 |

* cited by examiner

LIGHT SOURCE MODULE AND DUAL DISPLAY DEVICE

CROSS-REFERENCE TO RELATED APPLICATION

This application claims the priority benefit of China application 202021624797.X, filed on 2020 Aug. 7. The entirety of the above-mentioned patent application is hereby incorporated by reference herein and made a part of this specification.

FIELD OF THE INVENTION

The invention relates to a light source module, and more particularly to a light source module capable of emitting light on both sides and a dual display device using the light source module.

BACKGROUND OF THE INVENTION

A liquid crystal display panel of a liquid crystal display device does not emit light, so a surface light source needs to be provided by a backlight module. The backlight module includes a direct type backlight module and an edge type backlight module. A current common direct type backlight module is to dispose a plurality of light emitting diodes (LEDs) arranged in a two-dimensional array under a diffusion plate. However, although the direct type backlight module has better brightness uniformity, there are disadvantages of thicker thickness.

The current edge type backlight module has a smaller thickness than that of the direct type backlight module due to that a LED light bar is disposed on a side of a light guide plate. However, the edge type backlight module in the prior art requires a pair of light guide plate and light source. Therefore, in the dual liquid crystal display device, two sets of backlight modules are needed, which increases the size and weight of the dual liquid crystal display device.

In addition, the light emitting angles of the two screens are the same. Therefore, when the viewing positions of the users on both sides are different, the brightness of the screen on one side may not reach the optimal brightness when the screen is viewed.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module for adjusting the brightness of the light emitted from both sides of a dual display device.

The invention provides a dual display device, which may improve the brightness when the user is viewing the display screen from a non-normal viewing angle and has the advantages of thinner thickness and lighter weight, compared with the prior art.

Other advantages and objects of the invention may be further illustrated by the technical features broadly embodied and described as follows.

In order to achieve one or a portion of or all of the objects or other objects, a light source module provided in an embodiment of the invention includes a light guide plate, a light source, a first inverse prism sheet and a second inverse prism sheet. The light guide plate has a first light exit surface, a second light exit surface opposite to the first light exit surface, and a light incident surface connected between the first light exit surface and the second light exit surface. The second light exit surface has a plurality of microstructures. The light source is disposed beside the light incident surface. The light source is adapted to emit light into the light guide plate through the light incident surface. The first inverse prism sheet is disposed beside the first light exit surface of the light guide plate. The first inverse prism sheet has a first bearing surface and a plurality of first prisms, the plurality of first prisms are disposed on the first bearing surface and face the first light exit surface. Each of the first prisms has a first surface, the first surface is inclined with respect to the first bearing surface and faces away from the light source. A first included angle is formed between the first surface and the first bearing surface. The second inverse prism sheet is disposed beside the second light exit surface of the light guide plate. The second inverse prism sheet has a second bearing surface and a plurality of second prisms, the plurality of second prisms are disposed on the second bearing surface and face the second light exit surface. Each of the second prisms has a second surface, the second surface is inclined with respect to the second bearing surface and faces away from the light source. A second included angle is formed between the second surface and the second bearing surface.

In order to achieve one or a portion of or all of the objects or other objects, a dual display device provided in an embodiment of the invention includes a first display panel, a second display panel, and the above-mentioned light source module. The first display panel is disposed on a side of the first inverse prism sheet away from the light guide plate. The second display panel is disposed on a side of the second inverse prism sheet away from the light guide plate.

In the light source module of the embodiment of the invention, the light guide plate has a plurality of microstructures. When the light is transmitted to the microstructures, part of the light may be refracted and emitted from the second light exit surface, and part of the light may be reflected and emitted from the first light exit surface, achieving the effect of light emission on both sides. In addition, each first prism on the first inverse prism sheet has a first surface, and a first included angle is formed between the first surface and the first bearing surface; each second prism on the second inverse prism sheet has a second surface, and a second included angle is formed between the second surface and the second bearing surface. By adjusting the angles of the first included angle and the second included angle, the angle of the forward light emitted from the light guide plate may be changed, thereby achieving the effect of respectively adjusting the angles of the light emitted from both sides of the light source module. Since the dual display device of the invention uses the above-mentioned light source module, compared with the prior art, the brightness when the user is viewing the display screen from a non-normal viewing angle may be improved. In addition, the dual display device of the invention only uses one set of the light source module to meet the requirements of double-sided display, and therefore has the advantages of thinner thickness and lighter weight.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
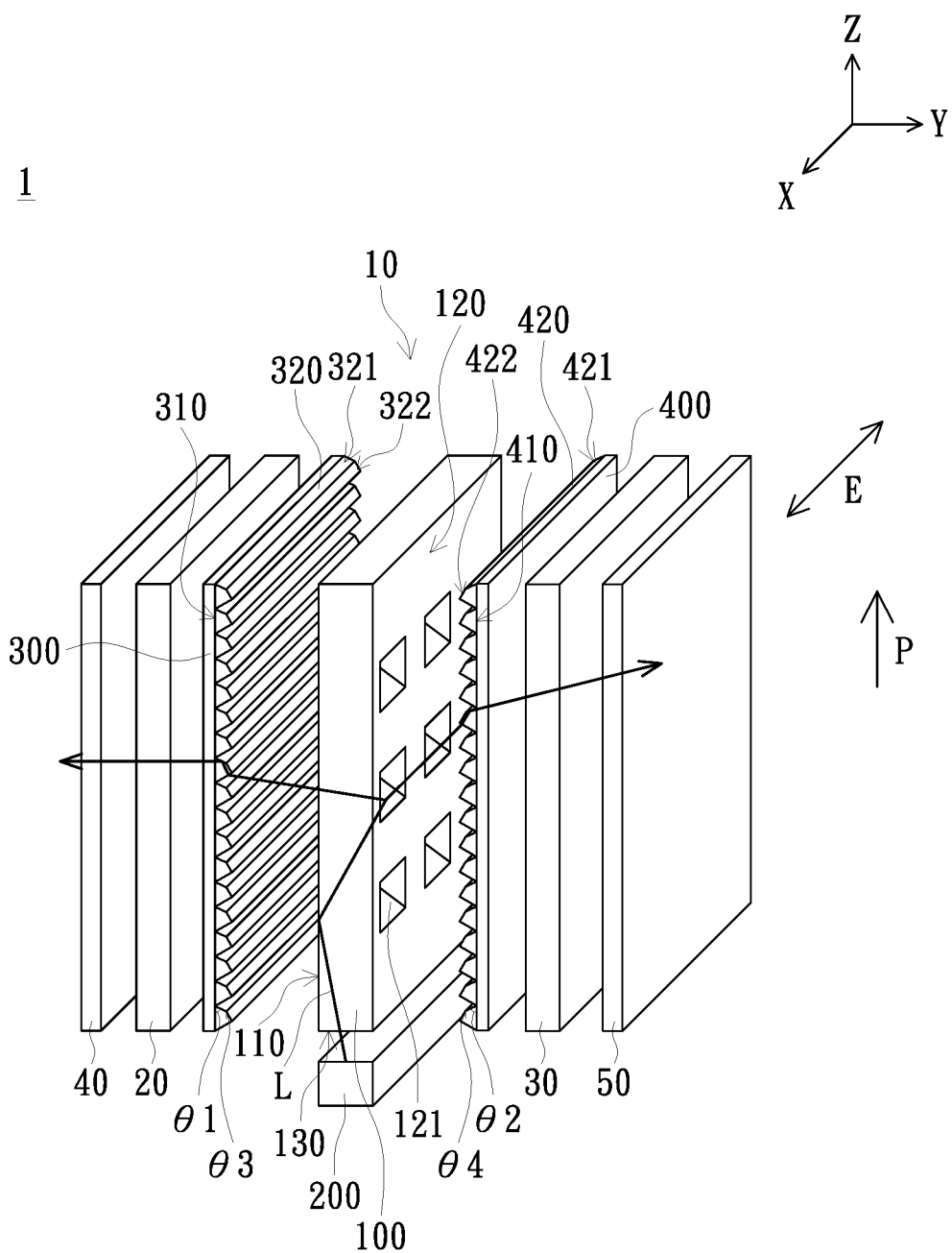
FIG. 1 is a three-dimensional cross-sectional schematic diagram of a dual display device of one embodiment of the invention.

FIG. 1 is a three-dimensional cross-sectional schematic diagram of a dual display device of one embodiment of the invention. Referring to FIG. 1, a dual display device 1 of the embodiment includes a light source module 10, a first display panel 20 and a second display panel 30. The first display panel 20 and the second display panel 30 are respectively disposed on two sides of the light source module 10.

The light source module 10 includes a light guide plate 100, a light source 200, a first inverse prism sheet 300 and a second inverse prism sheet 400. The light guide plate 100 has a first light exit surface 110, a second light exit surface 120 opposite to the first light exit surface 110, and a light incident surface 130 connected between the first light exit surface 110 and the second light exit surface 120. The second light exit surface 120 has, for example, a plurality of microstructures 121. The quantity and shape of the microstructures 121 are not particularly limited. FIG. 1 shows the microstructures 121 with six recessed triangular columnars, but is not limited thereto. In other embodiments, there may be protruded triangular columnar microstructures 121 uniformly distributed on the second light exit surface 120, but is not limited thereto. In another embodiment, the microstructures 121 may also be unevenly distributed on the second light exit surface 120. The light source 200 is disposed beside the light incident surface 130. The light source 200 is adapted to emit light L into the light guide plate 100 through the light incident surface 130. The first inverse prism sheet 300 is disposed beside the first light exit surface 110 of the light guide plate 100, and the first display panel 20 is disposed on a side of the first inverse prism sheet 300 away from the light guide plate 100. The second inverse prism sheet 400 is disposed beside the second light exit surface 120 of the light guide plate 100, and the second display panel 30 is disposed on a side of the second inverse prism sheet 400 away from the light guide plate 100.

In the embodiment, the light source 200 is, for example, a linear light source including a plurality of point light sources, wherein the point light sources are, for example, light emitting diodes (LEDs), but not limited thereto. The light source 200 may also be other types of linear light sources, such as light tubes, and the invention does not limit the type of the light source.

The first inverse prism sheet 300 has a first bearing surface 310 and a plurality of first prisms 320. The plurality of first prisms 320 are disposed on the first bearing surface 310 and face the first light exit surface 110. The plurality of first prisms 320 are arranged along a predetermined direction P away from the light incident surface 130. The predetermined direction P is, for example, parallel to the axial direction Z, but is not limited thereto. The second inverse prism sheet 400 has a second bearing surface 410 and a plurality of second prisms 420. The plurality of second prisms 420 are disposed on the second bearing surface 410 and face the second light exit surface 120. The plurality of second prisms 420 are arranged along the predetermined direction P. The first prisms 320 and the second prisms 420 extend along an extension direction E parallel to the light incident surface 130, for example. The extension direction E is, for example, parallel to the axial direction X, but is not limited thereto. That is, in the embodiment, the angle between the extending direction E and the predetermined direction P is 90 degrees, but it is not limited thereto.

Each of the first prisms 320 has a first surface 321, and the first surface 321 is inclined with respect to the first bearing surface 310 and faces away from the light source 200. A first included angle $\theta 1$ is formed between the first surface 321 and the first bearing surface 310. Each of the second prisms 420 has a second surface 421, and the second surface 421 is inclined with respect to the second bearing surface 410 and faces away from the light source 200. A second included angle $\theta 2$ is formed between the second surface 421 and the second bearing surface 410. The following will take the first prism 320 as an example to illustrate how to adjust the light emitting angle.

Figure 2A:
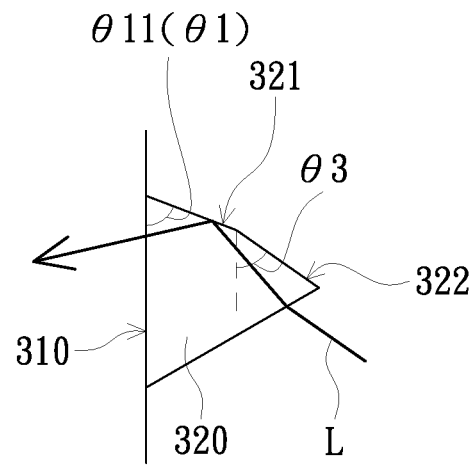
FIG. 2A and FIG. 2B are schematic diagrams of the first prisms of the first inverse prism sheet of one embodiment of the invention.
Figure 2B:
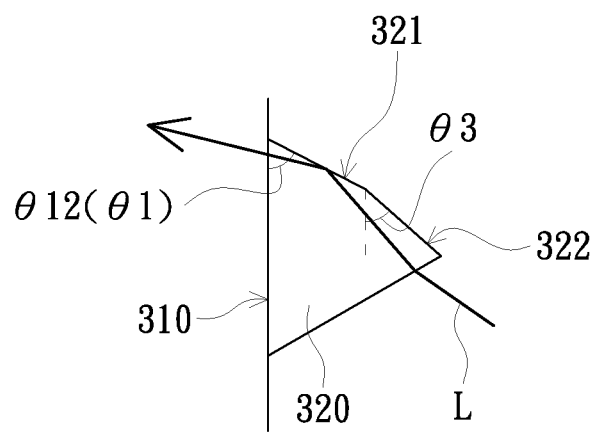

FIG. 2A and FIG. 2B are schematic diagrams of the first prism of the first inverse prism sheet of one embodiment of the invention. Referring to FIG. 1, FIG. 2A and FIG. 2B, after the light L is transmitted to the first prism 320, the light L is totally reflected on the first surface 321 away from the light source 200, and then exits from the first bearing surface 310 of the first inverse prism sheet 300. According to the principle of light reflection, when the first included angle $\theta 1$ (e.g., the first included angle $\theta 11$ shown in FIG. 2A) is bigger, the light emitting angle of the light L from the first inverse prism sheet 300 is lower (the lower here is relative to the axial direction Z in FIG. 1). This configuration is adapted to the situation in which the viewing position of the user is lower, so that the user with a lower viewing angle may have better brightness in the non-normal viewing angle. Specifically, the range of the first included angle $\theta 11$ is greater than or equal to 59.7° and less than or equal to 89.7°. On the other hand, when the first included angle $\theta 1$ (e.g., the first included angle $\theta 12$ shown in FIG. 2B) is smaller, the light emitting angle of the light L from the first inverse prism sheet 300 is higher (the higher here is relative to the axial direction Z in FIG. 1). This configuration is adapted to the situation in which the viewing position of the user is higher, so that the user with a higher viewing angle may have better brightness in the non-normal viewing angle. Specifically, the range of the first included angle $\theta 12$ is greater than or equal to 29.7° and less than or equal to 59.7°.

The above-mentioned angle adjustment of the first prism 320 is also applicable to the second prism 420 of the second inverse prism sheet 400. Specifically, the range of the bigger angle of the second included angle $\theta 2$ is greater than or equal to 59.7° and less than or equal to 89.7°. The range of the smaller angle of the second included angle $\theta 2$ is greater than or equal to 29.7° and less than or equal to 59.7°. However, the above-mentioned angle range is only a specific embodiment of the invention, and the invention does not particularly limit the angle range of the first included angle $\theta 1$ and the second included angle $\theta 2$. In addition, consider to the situation that different users respectively watch the first display panel 20 and the second display panel 30 of the dual display device 1 at the same time, since different users have different viewing positions, the first included angle $\theta 1$ of the first prism 320 and the second included angle $\theta 2$ of the second prism 420 may be adjusted respectively according to requirements, so that different users may have better brightness when viewing on both sides of the dual display device 1.

Refer to FIG. 1 again. The first display panel 20 and the second display panel 30 are, for example, a liquid crystal display panel, wherein the type of the liquid crystal display panel is, for example, a transmissive display panel or a semi-reflective/semi-transmissive display panel, but is not limited thereto.

The dual display device 1 of the embodiment may further include a first cover sheet 40 and a second cover sheet 50. The first cover sheet 40 is disposed on a side of the first display panel 20 away from the first inverse prism sheet 300. The second cover sheet 50 is disposed on a side of the second display panel 30 away from the second inverse prism sheet 400. The first cover sheet 40 and the second cover sheet 50 are, for example, a cover glass for providing dustproof and protective functions. In another embodiment, the first cover sheet 40 and the second cover sheet 50 further include, for example, a touch layer, which enables the dual display device 1 to have a touch function. The first cover sheet 40 and the second cover sheet 50 of the embodiment may be used alternatively.

In the light source module 10 of the embodiment, the light guide plate 100 has a plurality of microstructures 121. When the light L is transmitted to the microstructures 121, part of the light L may be refracted and emitted from the second light exit surface 120, and part of the light L may be reflected and emitted from the first light exit surface 110, thereby achieving the effect of light emission on both sides. In addition, each first prism 320 has a first surface 321, and a first included angle $\theta 1$ is formed between the first surface 321 and the first bearing surface 310. Each second prism 420 has a second surface 421, and a second included angle $\theta 2$ is formed between the second surface 421 and the second bearing surface 410. By adjusting the angles of the first included angle $\theta 1$ and the second included angle $\theta 2$, the angle of the forward light L emitted from the light guide plate 100 may be changed, thereby achieving the effect of respectively adjusting the angles of the light emitted from both sides of the light source module 10. Since the dual display device 1 of the invention uses the light source module 10, the brightness when the user is viewing the display screen from a non-normal viewing angle may be improved, compared with the prior art. In addition, the dual display device 1 of the invention can meet the requirements of double-sided display by only using one set of the light source module 10 to, and therefore has the advantages of smaller thickness and lighter weight.

In the design of the embodiment, the first prism 320 further has a third surface 322, for example. The third surface 322 is inclined with respect to the first bearing surface 310 and the first surface 321 respectively. The third surface 322 is disposed on a side of the first prism 320 away from the light source 200, and the first surface 321 is connected between the third surface 322 and the first bearing surface 310. Specifically, a third included angle $\theta 3$ is formed between the third surface 322 and the first bearing surface 310. The third included angle $\theta 3$ is different from the first included angle $\theta 1$, which means that the slope of the third surface 322 is different from the slope of the first surface 321. In another embodiment, the side of the first prism 320 away from the light source 200 may have the first surface 321 only, for example.

Similarly, the second prism 420 further has a fourth surface 422, for example. The fourth surface 422 is inclined with respect to the second bearing surface 410 and the second surface 421 respectively. The fourth surface 422 is disposed on a side of the second prism 420 away from the light source 200, and the second surface 421 is connected between the fourth surface 422 and the second bearing surface 410. Specifically, a fourth included angle $\theta 4$ is formed between the fourth surface 422 and the second bearing surface 410. The fourth included angle $\theta 4$ is different from the second included angle $\theta 2$, which means that the slope of the fourth surface 422 is different from the slope of the second surface 421. In another embodiment, the side of the second prism 420 away from the light source 200 may have the second surface 421 only, for example.

Figure 3:
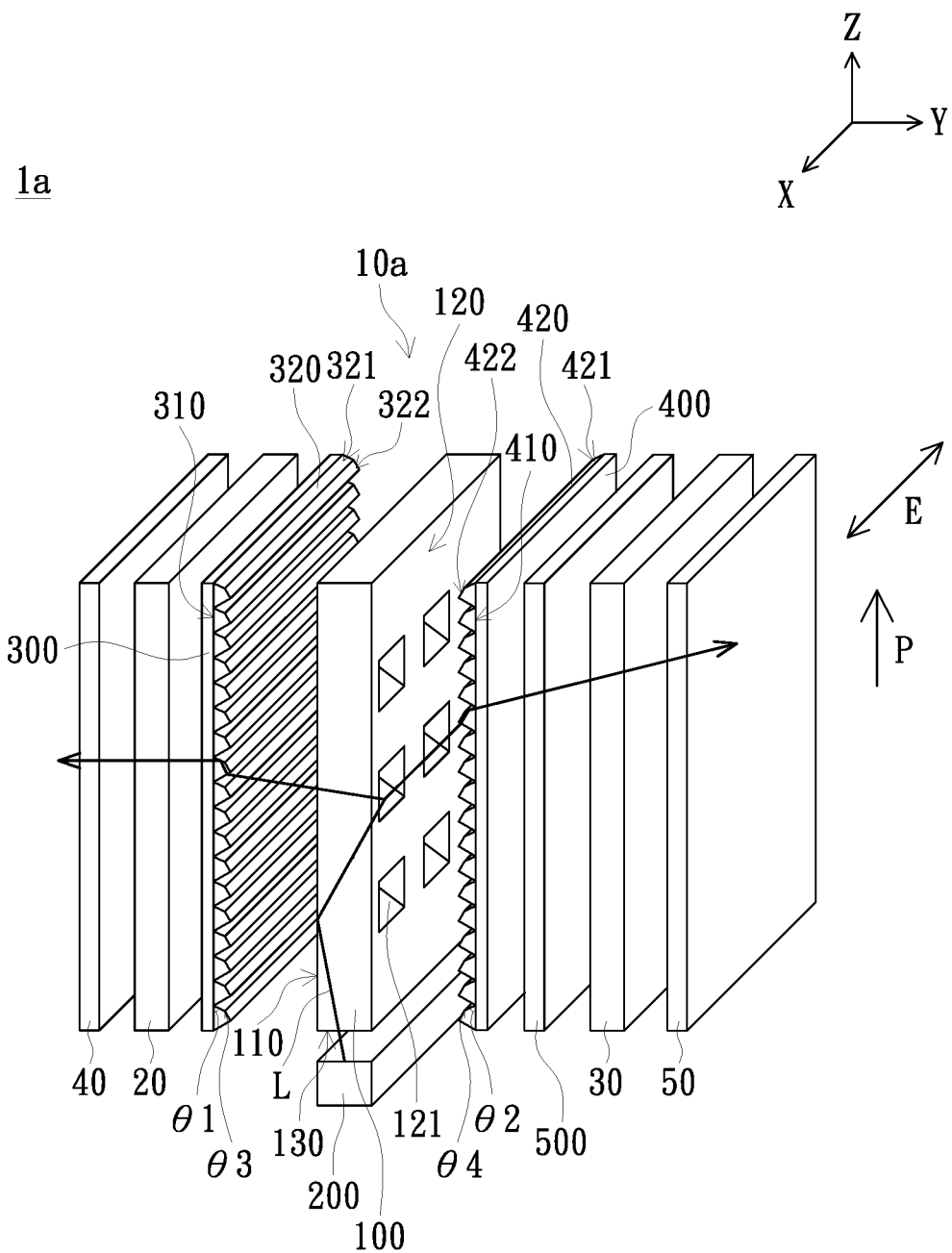
FIG. 3 is a three-dimensional cross-sectional schematic diagram of a dual display device of another embodiment of the invention.

FIG. 3 is a three-dimensional cross-sectional schematic diagram of a dual display device of another embodiment of the invention. Referring to FIG. 3, the dual display device 1a of the embodiment is similar in structure to the dual display device 1, the only difference is that the light source module 10a of the embodiment may further include an optical element 500. The optical element 500 is disposed on the side of the second inverse prism sheet 400 away from the light guide plate 100, but is not limited thereto. In another embodiment, the optical element 500 may also be disposed on the side of the first inverse prism sheet 300 away from the light guide plate 100, for example. The optical element 500 is adapted to receive and adjust the light emitting angle of the light L.

The optical element 500 includes, for example, a polymer dispersed liquid crystal (PDLC) film and a liquid crystal lens, but the invention does not particularly limit the type of the optical element 500.

The alignment direction of liquid crystal molecules in the polymer dispersed liquid crystal film may be changed by voltage adjustment, so that the polymer dispersed liquid crystal film may be used to diffuse light. An atomization state is exhibited when the refractive index of the liquid crystal molecules is different from that of the high molecular polymer. When the alignment directions of the liquid crystal molecules are uniform, the refractive index of the liquid crystal molecules and the refractive index of the high molecular polymer are the same, and therefore a transparent state is exhibited. Therefore, the polymer dispersed liquid crystal film may reduce the brightness of the light source module 10a at a single viewing angle (forward light emission), and improve the brightness of non-normal viewing angle.

The alignment direction of liquid crystal molecules in the liquid crystal lens may also be changed by voltage adjustment, so that the electric field distribution of the liquid crystal lens presents a gradual lens effect. Therefore, the light may be further refracted, and the light emitting angle of the light source module 10a may be changed.

With the combination of the first inverse prism sheet 300, the second inverse prism sheet 400 and the optical element 500, the light source module 10a of the embodiment may have a larger adjustment space in adjusting the light emitting angle of both sides.

In summary, in the light source module of the embodiment of the invention, the light guide plate has a plurality of microstructures. When the light is transmitted to the microstructures, part of the light may be refracted and emitted from the second light exit surface, and part of the light may be reflected and emitted from the first light exit surface, achieving the effect of light emission on both sides. In addition, each first prism on the first inverse prism sheet has a first surface, and a first included angle is formed between the first surface and the first bearing surface; each second prism on the second inverse prism sheet has a second surface, and a second included angle is formed between the second surface and the second bearing surface. By adjusting the angles of the first included angle and the second included angle, the angle of the forward light emitted from the light guide plate may be changed, thereby achieving the effect of respectively adjusting the angles of the light emitted from both sides of the light source module. Since the dual display device of the invention uses the above-mentioned light source module, compared with the prior art, the brightness when the user is viewing the display screen from a non-normal viewing angle may be improved. In addition, the dual display device of the invention only uses one set of the light source module to meet the requirements of double-sided display, and therefore has the advantages of thinner thickness and lighter weight.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first display panel, the second display panel, the first cover sheet, the second cover sheet, the first light exit surface, the second light exit surface, the first inverse prism sheet, the second inverse prism sheet, the first bearing surface, the second bearing surface, the first prism, the second prism, the first surface, the second surface, the third surface, the fourth surface, the first included angle, the second included angle, the third included angle and the fourth included angle are only used for distinguishing various elements and do not limit the number of the elements.

What is claimed is:

1. A light source module, comprising:
   a light guide plate, having a first light exit surface, a second light exit surface opposite to the first light exit surface, and a light incident surface connected between the first light exit surface and the second light exit surface, wherein the second light exit surface has a plurality of microstructures;
   a light source, disposed beside the light incident surface, wherein the light source is adapted to emit light into the light guide plate through the light incident surface;
   a first inverse prism sheet, disposed beside the first light exit surface of the light guide plate, wherein the first inverse prism sheet has a first bearing surface and a plurality of first prisms, the plurality of first prisms are disposed on the first bearing surface and face the first light exit surface, each of the first prisms has a first surface, the first surface is inclined with respect to the first bearing surface and faces away from the light source, and a first included angle is formed between the first surface and the first bearing surface;

a second inverse prism sheet, disposed beside the second light exit surface of the light guide plate, wherein the second inverse prism sheet has a second bearing surface and a plurality of second prisms, the plurality of second prisms are disposed on the second bearing surface and face the second light exit surface, each of the second prisms has a second surface, the second surface is inclined with respect to the second bearing surface and faces away from the light source, and a second included angle is formed between the second surface and the second bearing surface; and an optical element, adapted to receive and adjust a light emitting angle of the light, wherein the optical element is disposed on a side of the second inverse prism sheet away from the light guide plate;

wherein a range of one of the first included angle and the second included angle is great than or equal to 29.7° and less than or equal to 59.7°, and a range of the other one of the first included angle and the second included angle is great than or equal to 59.7° and less than or equal to 89.7°.

2. The light source module according to claim 1, wherein the optical element comprises a polymer dispersed liquid crystal film.

3. The light source module according to claim 1, wherein the optical element comprises a liquid crystal lens.

4. The light source module according to claim 1, wherein each of the plurality of first prisms further has a third surface, the third surface is inclined with respect to the first bearing surface and the first surface respectively and faces away from the light source, and the first surface is connected between the third surface and the first bearing surface.

5. The light source module according to claim 1, wherein each of the plurality of second prisms further has a fourth surface, the fourth surface is inclined with respect to the second bearing surface and the second surface respectively and faces away from the light source, and the second surface is connected between the fourth surface and the second bearing surface.

6. The light source module according to claim 1, wherein a range of the first included angle is greater than or equal to 29.7° and less than or equal to 59.7°.

7. The light source module according to claim 1, wherein a range of the second included angle is greater than or equal to 29.7° and less than or equal to 59.7°.

8. The light source module according to claim 1, wherein a range of the first included angle is greater than or equal to 59.7° and less than or equal to 89.7°.

9. The light source module according to claim 1, wherein a range of the second included angle is greater than or equal to 59.7° and less than or equal to 89.7°.

10. The light source module according to claim 1, wherein the plurality of first prisms and the plurality of second prisms are arranged along a predetermined direction away from the light incident surface and extended along an extension direction parallel to the light incident surface.

11. A dual display device, comprising:
a light source module, comprising:
a light guide plate, having a first light exit surface, a second light exit surface opposite to the first light exit surface, and a light incident surface connected between the first light exit surface and the second light exit surface, wherein the second light exit surface has a plurality of microstructures;
a light source, disposed beside the light incident surface, wherein the light source is adapted to emit light into the light guide plate through the light incident surface;
a first inverse prism sheet, disposed beside the first light exit surface of the light guide plate, wherein the first inverse prism sheet has a first bearing surface and a plurality of first prisms, the plurality of first prisms are disposed on the first bearing surface and face the first light exit surface, each of the first prisms has a first surface, the first surface is inclined with respect to the first bearing surface and faces away from the light source, and a first included angle is formed between the first surface and the first bearing surface;
a second inverse prism sheet, disposed beside the second light exit surface of the light guide plate, wherein the second inverse prism sheet has a second bearing surface and a plurality of second prisms, the plurality of second prisms are disposed on the second bearing surface and face the second light exit surface, each of the second prisms has a second surface, the second surface is inclined with respect to the second bearing surface and faces away from the light source, and a second included angle is formed between the second surface and the second bearing surface; and
an optical element, adapted to receive and adjust a light emitting angle of the light, wherein the optical element is disposed on a side of the second inverse prism sheet away from the light guide plate;
a first display panel, disposed on a side of the first inverse prism sheet away from the light guide plate; and
a second display panel, disposed on a side of the second inverse prism sheet away from the light guide plate;
wherein a range of one of the first included angle and the second included angle is great than or equal to 29.7° and less than or equal to 59.7°, and a range of the other one of the first included angle and the second included angle is great than or equal to 59.7° and less than or equal to 89.7°.

* * * * *